United States Patent
Cho et al.

(10) Patent No.: US 10,173,561 B2
(45) Date of Patent: Jan. 8, 2019

(54) SEAT DEVICE OPERATIVELY CONNECTED TO HVAC APPARATUS

(71) Applicants: Hyundai Motor Company, Seoul (KR); Hyundai Dymos Inc., Seosan, Chungcheongnam-do (KR)

(72) Inventors: Kwang Woon Cho, Gyeonggi-do (KR); Ho Sub Lim, Seoul (KR); Myoung Jin Lee, Gyeonggi-do (KR); Do Hyung Kim, Gyeonggi-do (KR)

(73) Assignees: Hyundai Motor Company, Seoul (KR); Hyundai Dymos Inc., Seosan, Chungcheongnam-do (KR)

( * ) Notice: Subject to any disclaimer, the term of this patent is extended or adjusted under 35 U.S.C. 154(b) by 454 days.

(21) Appl. No.: 14/964,094

(22) Filed: Dec. 9, 2015

(65) Prior Publication Data

US 2017/0080837 A1 Mar. 23, 2017

(30) Foreign Application Priority Data

Sep. 21, 2015 (KR) .................. 10-2015-0133121

(51) Int. Cl.
*B60N 2/56* (2006.01)

(52) U.S. Cl.
CPC ......... *B60N 2/5628* (2013.01); *B60N 2/5657* (2013.01); *B60N 2/5678* (2013.01)

(58) Field of Classification Search
CPC ...... B60N 2/56; B60N 2/5628; B60N 2/5657; B60N 2/5678
USPC .................................................. 297/180.13
See application file for complete search history.

(56) References Cited

U.S. PATENT DOCUMENTS

| 6,871,696 B2* | 3/2005 | Aoki | B60H 1/00285 165/203 X |
| 9,004,993 B2* | 4/2015 | Fujii | B60H 1/00285 297/180.13 |
| 2003/0102699 A1* | 6/2003 | Aoki | B60H 1/00285 297/180.13 X |
| 2004/0113468 A1* | 6/2004 | Swanson | B60H 1/00592 297/180.13 |

FOREIGN PATENT DOCUMENTS

| JP | S60-163106 U | 10/1985 |
| JP | S62-170311 U | 10/1987 |
| JP | 2001-018642 A | 1/2001 |
| JP | 2001-180263 A | 7/2001 |
| JP | 2006-335317 A | 12/2006 |
| JP | 2007-137185 A | 6/2007 |
| KP | 10-2015-0063707 A | 6/2015 |
| KR | 2008-0037901 A | 5/2008 |
| KR | 10-2013-0053469 A | 5/2013 |

* cited by examiner

*Primary Examiner* — Anthony D Barfield
(74) *Attorney, Agent, or Firm* — Mintz Levin Cohn Ferris Glovsky and Popeo, P.C.; Peter F. Corless

(57) ABSTRACT

A seat device operatively connected to an HVAC apparatus is provided. The seat device includes the HVAC apparatus to adjust the indoor air within a vehicle. A seat blower is mounted on a seat to blow indoor air, introduced through an inlet thereof, to a seat cushion and a seat back. A connecting duct allows airflow between the seat blower and the HVAC apparatus and a mesh frame connects a circumferential edge of the inlet of the seat blower with the connecting duct to allow ventilation therethrough.

11 Claims, 4 Drawing Sheets

A-A CROSS SECTION

US 10,173,561 B2

SEAT DEVICE OPERATIVELY CONNECTED TO HVAC APPARATUS

CROSS-REFERENCE TO RELATED APPLICATION

This application claims under 35 U.S.C. § 119(a) the benefit of priority to Korean Patent Application No. 10-2015-0133121 filed on Sep. 21, 2015, the entire contents of which are incorporated herein by reference.

BACKGROUND (a) Technical Field

The present disclosure relates to a seat device operatively connected to a heating ventilation air-conditioning (HVAC) apparatus, and more particularly, to a seat device operatively connected to an HVAC apparatus, which is constructed to implement ventilation of a seat and cooling and heating of a rear seat.

(b) Background Art

A vehicle seat may be mostly composed of a seat cushion that operates as a seating part for supporting the load of a occupant's lower body, and a seat back that operates as a backrest for supporting the load of a occupant's upper body. Various technologies have been adopted for seats having such a construction to ensure a comfortable environment for occupants.

The above information disclosed in this section is merely for enhancement of understanding of the background of the invention and therefore it may contain information that does not form the prior art that is already known in this country to a person of ordinary skill in the art.

SUMMARY

The present invention provides a seat device that is operatively connected to an HVAC apparatus, which may be connected between an inlet of a seat ventilation blower and a connecting duct of the HVAC apparatus with a space defined therebetween to concurrently draw or suction both indoor air and air supplied from the HVAC apparatus, and which may include a breathable non-woven sheet disposed at the inlet of the seat blower to suction indoor air to ensure seat cooling performance upon operation of the HVAC apparatus. Additionally, the present invention provides a seat device operatively connected to an HVAC apparatus, which may be constructed to independently implement seat ventilation and seat back vent using air supplied from the HVAC apparatus to ensure both the seat ventilation performance and rear seat cooling and heating performance.

In one aspect, the present invention provides a seat device operatively connected to an HVAC apparatus, the seat device may include the HVAC apparatus configured to adjust air within a vehicle, a seat blower mounted on a seat to blow indoor air introduced through an inlet thereof, to a seat cushion and a seat back, a connecting duct configured to allow airflow between the seat blower and the HVAC apparatus, and a mesh frame connected between the circumferential edge of the inlet of the seat blower and the connecting duct to allow ventilation therethrough.

In an exemplary embodiment, the inlet of the seat blower may be spaced apart from an end of the connecting duct by a predetermined distance in a width direction. In addition, the inlet of the seat blower may be spaced apart from an end of the connecting duct by a predetermined distance in a vertical direction. The mesh frame may include a breathable non-woven sheet to prevent the air introduced through the inlet of the seat blower from leaking into the vehicle. The seat device may further include an air direction changing ventilation unit mounted on the seat and connected to the HVAC apparatus for the reception of air, to discharge the air supplied from the HVAC apparatus to one or both of the rear surface of the seat back and the lower surface of the seat cushion.

In addition, the air direction changing ventilation unit may include an upper duct mounted in the seat back to discharge air to the rear surface of the seat back, an intermediate duct, connected to the upper duct to allow airflow therebetween, and which may include an opening to discharge air to the lower surface of the seat cushion, a mode-changing door configured to open and close the opening, and a door actuator configured to open and close the mode-changing door. The air direction changing ventilation unit may further include a controller configured to operate the actuation of the door actuator. The controller may also be configured to operate the mode-changing door to close the opening of the intermediate duct using the door actuator in a mode in which the HVAC apparatus blows air toward occupant's upper body.

In addition, the controller may be configured to operate the mode-changing door to partially close the opening of the intermediate duct by setting the door actuator to a mode in which the HVAC apparatus blows air to both the upper and lower bodies of the occupant (e.g., toward the passenger and toward a lower portion of the vehicle, that is, by the passenger's feet). The controller may also be configured to operate the mode-changing door to open the opening of the intermediate duct by setting the door actuator to a mode in which the HVAC apparatus blows air to occupant's lower body. The air direction changing ventilation unit may further include a seat back flexible duct, which is deformable based on variation in position The air direction changing ventilation unit may also include a seat cushion flexible duct, which is deformable based on variation in position of the seat cushion and which is connected between the intermediate duct and the HVAC apparatus. The connecting duct may be connected between the seat blower and the HVAC apparatus to allow airflow therebetween, and may include a flexible duct at the center thereof, which is deformable based on variation in the position of the seat cushion.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
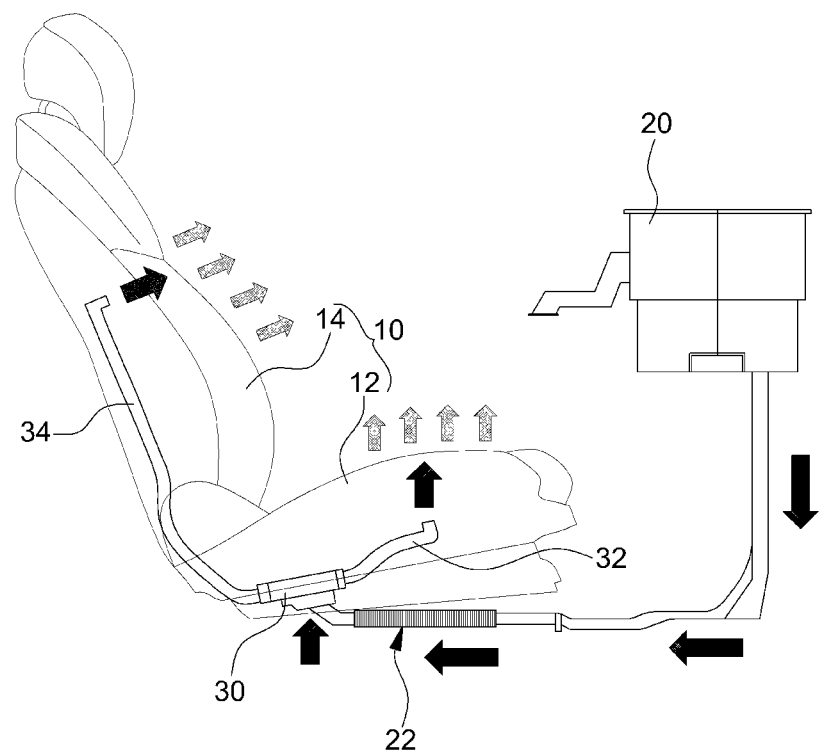
FIG. 1 is a view illustrating airflow for cooling in a seat device operatively connected to an HVAC apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the attached drawings so as to enable the exemplary embodiments to be easily understood by one of ordinary skill in the art to which this invention belongs.

As shown in FIG. 1, according to an exemplary embodiment of the present invention, the seat 10 of a vehicle may be connected to a heating, ventilating, and air conditioning (HVAC) apparatus 20 to adjust the air within the vehicle. As known in the art, the HVAC apparatus, which is intended to adjust the temperature and the like of the air within the vehicle, is configured to supply cold air to the vehicle to decrease the indoor temperature during the air cooling operation and to supply hot air to the vehicle to increase the indoor temperature during the air heating operation.

Figure 2:
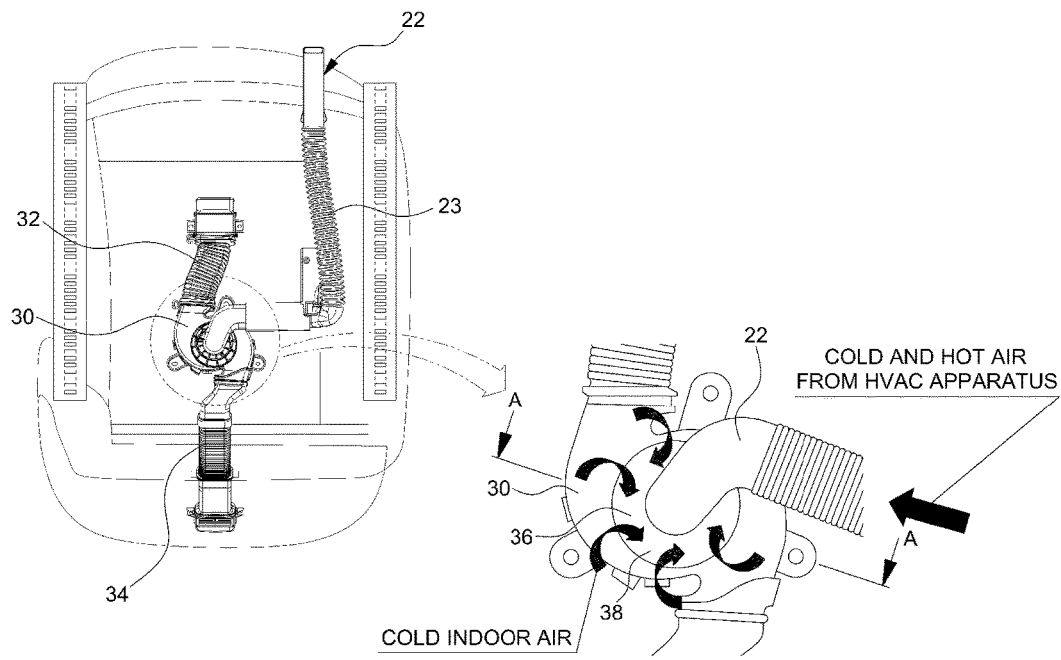
FIGS. 2 and 3 are views illustrating a ventilation structure of the seat device operatively connected to an HVAC apparatus according to an exemplary embodiment of the present invention.

The seat 10 may be constituted by a seat cushion 12, operating as a seating face part to support the load of a occupant's lower body, and a seat back 14, operating as a backrest to support the load of the occupant's upper body. As shown in FIG. 2, the seat cushion 12 may be disposed there beneath with a seat blower 30 configured to suction and discharge (e.g. blow) ventilation air. The seat blower 30 may be configured to suction indoor air in a vehicle and to discharge the air to the seat cushion 12 and the seat back 14. The seat blower 30 may include a blower inlet 31 adapted to allow the introduction of air during the drawing of indoor air. The seat blower 30 may be connected to a first blowing duct 32 and a second blowing duct 34, which are configured to blow the air, introduced through the blower inlet 31, to the seat cushion 12 and the seat back 14, respectively. The first blowing duct 32 may extend toward the seat cushion 12, and the second blowing duct 34 may extend toward the seat back 14.

A connecting duct 22 may be connected between the seat blower 30 and the HVAC apparatus 20 to allow the cold air or hot air supplied from the HVAC apparatus 20 to flow therethrough. The air, cooled or heated at the HVAC apparatus 20 and supplied to the connecting duct 22, may be introduced into the seat blower 30 through the blower inlet 31 connected to the connecting duct 22, and may be blown to the seat cushion 12 and the seat back 14, together with indoor air suctioned by the seat blower 30.

Figure 3:
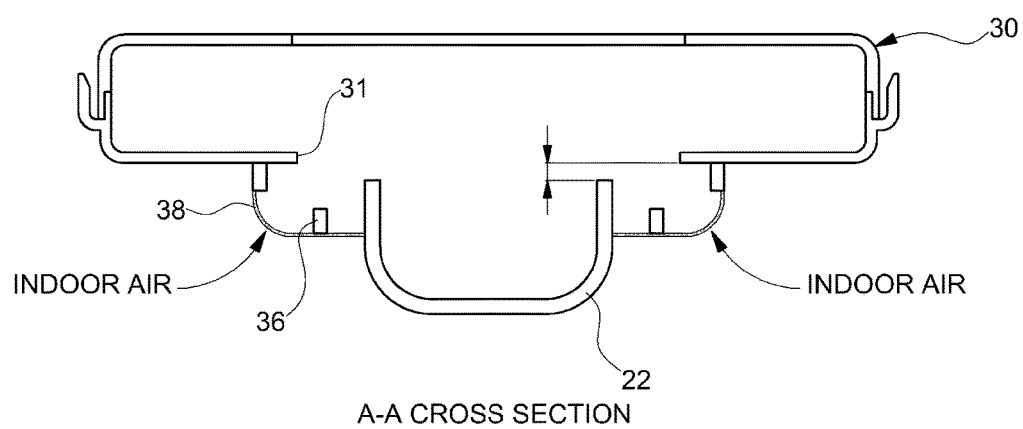

In addition, to fulfill the ventilation function by minimizing the reduction in the amount of air discharged from the HVAC apparatus 20 for heating or cooling indoor air and by allowing indoor air to be suctioned even when the HVAC apparatus 20 is turned off (non-operation), the blower inlet 31 may be connected to the connecting duct 22 via a mesh frame 36, as shown in FIG. 3. The mesh frame 36, having a mesh structure, may be mounted on the circumferential edge of the blower inlet 31 to allow ventilation and may be integrally connected to the connecting duct 22 to allow indoor air to be suctioned therethrough during the operation of the seat blower 30.

The blower inlet 31 may be spaced apart from the end of the connecting duct 22 by a predetermined space in a width direction, and may also be spaced apart from the end of the connecting duct 22 by a predetermined space in a vertical direction. The mesh frame 36 may include a breathable non-woven sheet 38 attached thereto to minimize or eliminate leakage of air, introduced through the blower inlet 31, to the inside of the vehicle. By attaching the breathable non-woven sheet 38 to the mesh frame 36, the leakage of cold or hot air to the inside from the blower inlet 31 may be minimized, to maintain the air suctioned into the seat blower 30 at a low or high temperature. By virtue of the spaced-apart arrangement or structural configuration between the blower inlet 31 and the connecting duct 22, it may be possible to ensure that a sufficient amount of air is blown to the seat cushion 12 and the seat back 14.

Furthermore, by connecting the blower inlet 31 and the connecting duct 22 through the mesh frame 36 with the space defined therebetween and by attaching the breathable non-woven sheet 38 to the mesh frame 36, it may be possible to prevent cold air of the HVAC apparatus 20, supplied through the connecting duct 22, from being discharged to the inside of a vehicle during the operation of the HVAC apparatus 20 and to suction the indoor air during non-operation of the HVAC apparatus 20 (e.g., when the HVAC apparatus is turned off). When the seat ventilation structure is applied to a seat, the provision of a rear seat vent structure, which is operable independently of the seat ventilation structure to cool and heat the rear seat, may satisfy both the functions of seat ventilation and rear seat vent.

Figure 4:
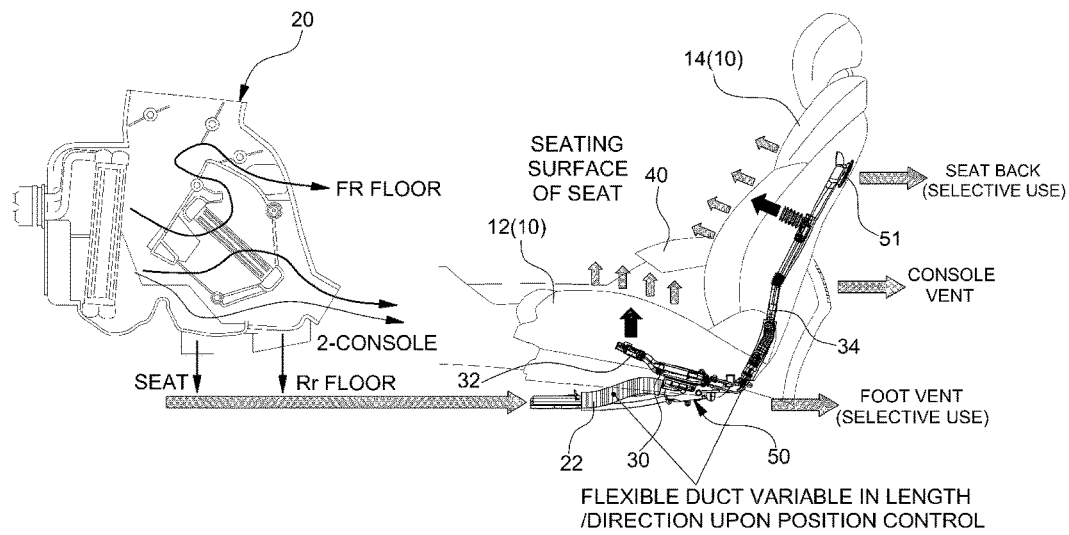
FIGS. 4 to 6 are views illustrating the seat device operatively connected to an HVAC apparatus according to an exemplary embodiment of the present invention.
Figure 5:
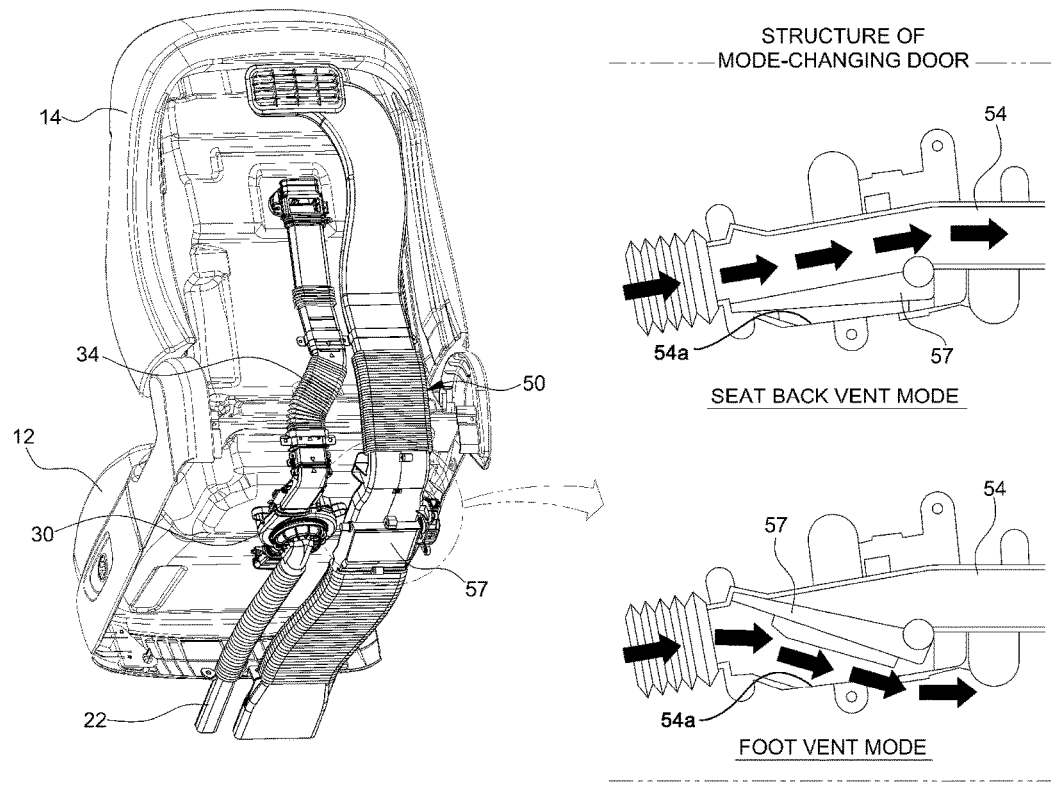
Figure 6:
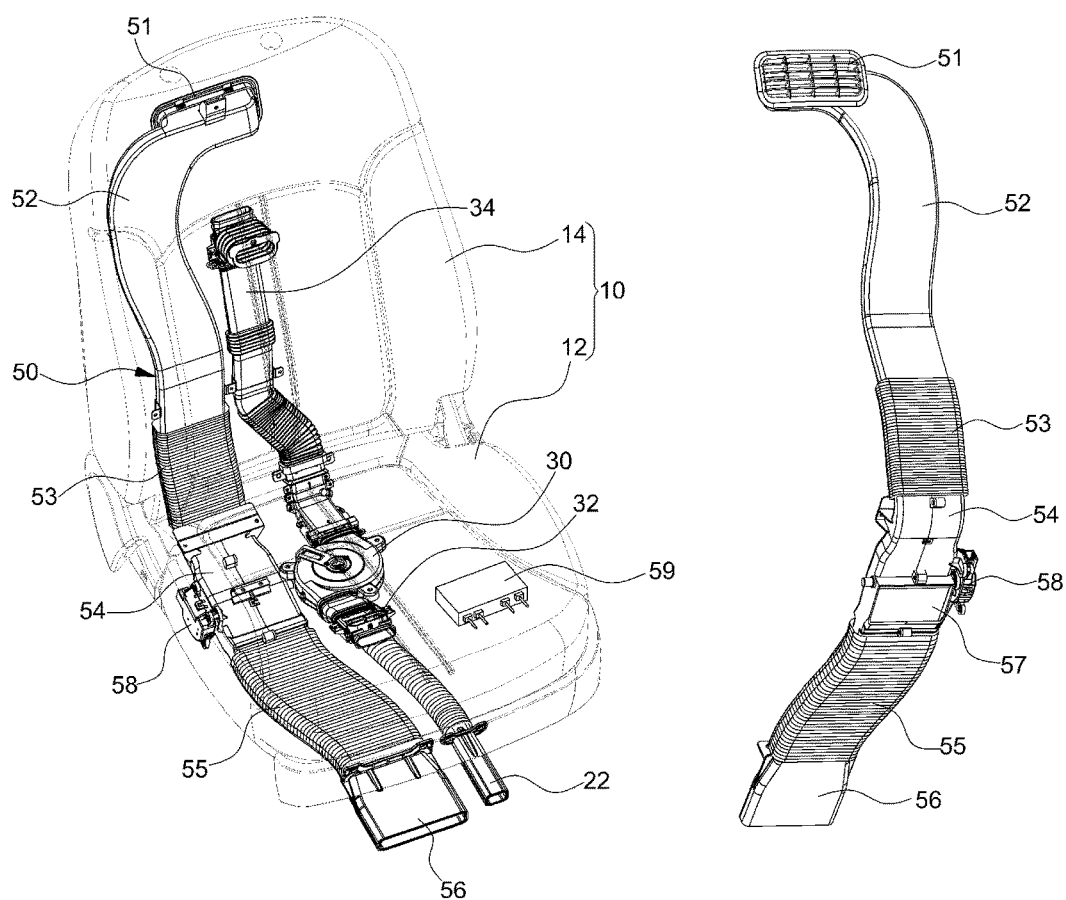

Among the accompanying drawings, FIG. 4 schematically illustrates the connecting structure between the HVAC apparatus and the seat and the seat vent structure. FIG. 5 illustrates a double-row vent structure applied to a seat and vent modes obtained by actuation of a mode converting door. FIG. 6 illustrates, in greater detail, the double-row vent structure applied to a seat. As shown in FIGS. 4 to 6, the HVAC apparatus 20, configured to adjust the air within a vehicle, may be connected to the seat blower 30 and to an air direction converting ventilation unit 50, which may be mounted on the seat 10, in a manner that allows air to flow.

As described above, the seat blower 30 may be configured to suction the indoor air within a vehicle and to blow the air to the seat cushion 12 and the seat back 14, and may be connected to the HVAC apparatus 20 through the connecting duct 22 to receive air through the connecting duct 22, thereby implementing seat ventilation using both the indoor air and air supplied from the HVAC apparatus 20.

The air direction converting ventilation unit 50 may be configured to receive air supplied from the HVAC apparatus 20 and to discharge the air to the rear floor of a vehicle and/or rearward of the seat back 14 to provide the rear-seat vent function. Accordingly, the air direction changing ventilation unit 50 may include an air direction control grill 51, an upper duct 52 and a seat back flexible duct 53, mounted on the seat back 14, and an intermediate duct 54, a seat cushion flexible duct 55, a lower duct 56 and a door actuator 58, mounted on the seat cushion 12.

The lower duct 56 may be disposed adjacent to the outlet of the HVAC apparatus 20, through which air may be discharged, to connect the seat cushion flexible duct 55 and the outlet of the HVAC apparatus 20 connected through the lower duct 56, to transfer the air introduced from the HVAC apparatus 20 to the air direction changing ventilation unit 50 and up to the upper duct 52. The air direction changing ventilation unit 50 may be connected to the HVAC apparatus 20 through the lower duct 56 to receive air from the HVAC apparatus 20 to discharge the air supplied from the HVAC apparatus 20 to one selected from the rear surface of the seat back 14 and the lower surface of the seat cushion 12, to direct the air rearward from the seat back 14 or to the rear floor. Alternatively, the air direction changing ventilation unit 50 may be configured to concurrently discharge the air to both the rear surface of the seat back 14 and the lower surface of the seat cushion 12.

The upper duct 52, mounted in the seat back 14 to discharge the air to the rear surface of the seat back 14, may be connected to the intermediate duct 54 through the seat back flexible duct 53 in a manner that allows air to flow, and the lower duct 56 may be connected to the intermediate duct 54 through the seat cushion flexible duct 55 in a manner that allow air to flow. The intermediate duct 54 may include an opening 54a through which the air may be discharged to the lower surface of the seat cushion 12, and a mode-changing door 57 configured to open and close the opening 54a.

The mode-changing door 57 may be hingedly installed in the intermediate duct 54 to open and close the opening 54a. Specifically, the mode-changing door 57 may be configured to close the internal channel of the intermediate duct 54 when the opening 54a is opened (e.g., a foot ventilation mode) and open the internal channel of the intermediate duct 54 when the opening 54a is closed (e.g., a seat back ventilation mode). In other words, the mode-changing door 57 may be configured to selectively open and close the internal channel and the opening 54a in the intermediate duct 54 to change the flow path of the air supplied from the HVAC apparatus 20. Furthermore, it may also be possible to partially open the internal channel of the intermediate duct 54 by partially opening the opening 54a.

In the foot ventilation mode, in which the opening 54a is fully opened, the mode-changing door 57 may be configured to completely close the internal channel of the intermediate duct 54 to blow the air discharged through the opening 54a to the rear floor. Meanwhile, in the seat back ventilation mode in which the opening 54a is completely closed, the mode-changing door 57 may be configured to fully open the internal channel of the intermediate duct 54 to transfer the air introduced through the lower duct 56 to the upper duct 52.

The door actuator 58 may be mounted on a lateral side of the intermediate duct 54 to provide the power required for the opening and closing by the mode-changing door 57. Specifically, the door actuator 58 may be configured to execute the opening and closing actuation of the mode-changing door 57 in response to a signal received from a controller 59, and accordingly the blowing path may be changed by the mode-changing door 57. The controller 59 may be installed in the seat cushion 12, and may be connected to the door actuator 58 to allow signal transmission therebetween.

The controller 59 may be configured to activate the door actuator 58 to execute the opening and closing actuation of the mode-changing door 57, to thus change the blowing path at the intermediate duct 54. The controller 59 may further be configured to transmit signals to the door actuator 58 to execute the opening and closing actuation of the mode-changing door 57 based on air direction control mode of the HVAC apparatus 20, thereby executing the vent mode of the seat 10.

In an example, in a vent mode in which the HVAC apparatus 20 blows air (e.g., cold air or hot air) to a front-seat occupant's upper body, the controller 59 may be configured to operate the mode-changing door 57 to close the opening 54a in the intermediate duct 54 using the door actuator 58. As a result, the air, transferred to the upper duct 52 through the internal channel of the intermediate duct 54, may be discharged rearward from the seat back 14 and thus may be blown to a rear-seat occupant's upper body.

In another example, in a bi-level mode, in which the HVAC apparatus 20 blows air (e.g., cold air or hot air) to both the upper and lower bodies of a front-seat occupant, the controller 59 may be configured to operate the mode-changing door 57 to partially close the opening 54a in the intermediate duct 54 using the door actuator 58. As a result, a portion of the air transferred to the upper duct 52 through the internal channel in the intermediate duct 54 may be discharged rearward from the seat back 14 and may thus be blown to a rear-seat occupant's upper body, and the remainder of the air, discharged downward from the seat cushion 12 through the opening 54a, may be supplied to the rear floor and thus may be blown to a rear-seat occupant's lower body.

In a further example, in a foot ventilation mode in which the HVAC apparatus 20 blows air (e.g., cold air or hot air) to a front-seat occupant's lower body near the feet, the controller 59 may be configured to operate the mode-changing door 57 to open the opening 54a in the intermediate duct 54 using the door actuator 58. As a result, all of the air introduced into the intermediate duct 54 due to the closing of the internal channel of the intermediate duct 54, may be discharged downward from the seat cushion 12 through the opening 54a and thus may be blown to a rear-seat occupant's lower body. Accordingly, the controller 59 may be configured to execute the above-described seat vent modes in conjunction with the controller of the HVAC apparatus 20.

The lower duct 56 may be connected to an outlet at the rear floor side of the HVAC apparatus 20, and the connecting duct 22 for allowing airflow between the seat blower 30 and the HVAC apparatus 20 may be connected to an outlet at the seat side of the HVAC apparatus 20. For slide movement of the seat 10 and positioning of the seat back 14, a bellows-shaped flexible structure, which is capable of flexible deformation such as contraction and expansion, may be applied to the air direction changing ventilation unit 50 and the connecting duct 22. In this exemplary embodiment, the above-mentioned seat back flexible duct 53 and the seat cushion flexible duct 55 may be applied to the air direction changing ventilation unit 50, while the flexible duct 23 (see FIG. 2) may be applied to the connecting duct 22.

In other words, the seat back flexible duct 53, flexibly deformable based on variation in position caused by tilting of the seat back 14 or the like, may be connected between the upper duct 52 and the intermediate duct 54 in the seat back 14, and the seat cushion flexible duct 55, flexibly deformable based on variation in position and height of the seat cushion 12 along with horizontal and vertical movement of the seat 10, may be connected between the intermediate duct 54 and the lower duct 56 on the lower surface of the seat cushion 12.

Meanwhile, the connecting duct 22 may include the flexible duct 23 at the center thereof, flexibly deformable based on variation in the position of the seat cushion 12. The seat back flexible duct 53, the seat cushion flexible duct 55 and the flexible duct 23 may be deformable in length (e.g., contraction and expansion) and shape when the positions of the seat 10 and the seat back 14 are adjusted, thereby enabling the transfer of air without loss. Furthermore, the upper duct 52, moved together with the seat back 14 upon variation in position of the seat back 14, such as tilting, may be disposed at the end thereof with the air direction control grill 51, disposed on the rear surface of the seat back 14 and may operate as the discharging outlet.

The air direction control grill 51 may be disposed on the rear surface of the seat back 14 (e.g., the seat back board) to discharge or blow the air (e.g., cold air or hot air), introduced into the upper duct 52 from the HVAC apparatus 20, to a rear-seat occupant. In addition, to adjust the direction in which the air blown, the air direction control grill 51 may have a lattice structure, capable of independently adjusting the blowing direction of air horizontally and vertically.

By virtue of the seat ventilation and vent structure, the ventilation performance of a front seat and the cooling and heating performance of a rear seat may be concurrently fulfilled. In addition, by selectively adjusting the discharge of air toward the rear surface of the seat back 14 and the lower surface of the seat cushion 12, it may be possible not to use a conventional door serving to adjust the flowing direction of air discharged from the HVAC apparatus 20 to the rear floor or the center pillar/console.

As is apparent from the above description, the seat device operatively connected to an HVAC apparatus according to an exemplary embodiment of the present invention may offer the following advantages.

1. It may be possible to improve the ventilation performance and cooling and heating performance of a seat without using an expensive thermoelectric element, thereby reducing costs and increasing performance.

2. It may be possible to improve the cooling and heating performance of a seat while minimizing the reduction in the amount of air that is discharged from an HVAC apparatus to adjust the indoor temperature, and it may be possible to maintain ventilation performance at a normal level even during seat ventilation when the HVAC apparatus is turned off.

3. By independently implementing seat ventilation and seat back ventilation using air supplied from an HVAC apparatus, both seat ventilation performance and cooling and heating performance for a rear seat may be satisfied.

4. Since the ventilation performance required to cool and heat a rear seat using air (e.g., cold air or hot air) supplied from an HVAC apparatus is fulfilled without the loss of air, it may be possible to discharge cold air or hot air to a rear seat while minimizing the loss of heat.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A seat device operatively connected to an heating, ventilation, and air-conditioning (HVAC) apparatus, comprising:
   the HVAC apparatus configured to adjust indoor air within a vehicle;
   a seat blower mounted on a seat to blow indoor air, introduced through an inlet thereof, to a seat cushion and a seat back;
   a connecting duct configured to allow airflow between the seat blower and the HVAC apparatus;
   a mesh frame that connects a circumferential edge of the inlet of the seat blower with the connecting duct to allow ventilation therethrough; and
   an air direction changing ventilation unit mounted on tire seat and connected to the HVAC apparatus for reception of air, to discharge air supplied from the HVAC apparatus to one or both of a rear surface of the seat back and a lower surface of the seat cushion,
   wherein the air direction changing ventilation unit includes:
   an upper duct mounted in the seat back to discharge air to the rear surface of the seat back;
   an intermediate duct, connected to the upper duct to allow airflow therebetween and which has an opening for discharging air to the lower surface of the seat cushion;
   a mode-changing door configured to selectively open and close the opening and the internal channel of the intermediate duct; and
   a door actuator configured to open and close the mode-changing door.

2. The seat device operatively connected to an HVAC apparatus according to claim 1, wherein the inlet of the seat blower is spaced apart from an end of the connecting duct by a predetermined distance in a width direction.

3. The seat device operatively connected to an HVAC apparatus according to claim 1, wherein the inlet of the seat blower is spaced apart from an end of the connecting duct by a predetermined distance in a vertical direction.

4. The seat device operatively connected to an HVAC apparatus according to claim 1, wherein the mesh frame includes a breathable non-woven sheet to prevent air introduced through the inlet of the seat blower from leaking to an inside of the vehicle.

5. The seat device operatively connected to an HVAC apparatus according to claim 1, wherein the air direction changing ventilation unit includes a controller configured to execute actuation of the door actuator.

6. The seat device operatively connected to an HVAC apparatus according to claim 5, wherein the controller is configured to operate the mode-changing door to close the opening of the intermediate duct using the door actuator in a mode in which the HVAC apparatus blows air to a seat occupant's upper body.

7. The seat device operatively connected to an HVAC apparatus according to claim 5, wherein the controller is configured to operate the mode-changing door to partially close the opening of the intermediate duct using the door actuator in a mode in which the HVAC apparatus blows air to both upper and lower bodies of a seat occupant.

8. The seat device operatively connected to an HVAC apparatus according to claim 5, wherein the controller is configured to operate the mode-changing door to open the opening of the intermediate duct using the door actuator in a mode in which the HVAC apparatus blows air to a seat occupant's lower body.

9. The seat device operatively connected to an HVAC apparatus according to claim 1, wherein the air direction changing ventilation unit includes a seat back flexible duct, deformable based on variation in position of the seat back and which connects the upper duct to the intermediate duct.

10. The seat device operatively connected to an HVAC apparatus according to claim 1, wherein the air direction changing ventilation unit includes a seat cushion flexible duct, deformable based on variation in position of the seat cushion and which connects the intermediate duct to the HVAC apparatus.

11. The seat device operatively connected to an HVAC apparatus according to claim 1, wherein the connecting duct connects the seat blower to the HVAC apparatus to allow airflow therebetween, and includes a flexible duct, deformable based on variation in position of the seat cushion.

* * * * *